(12) United States Patent
Kastrup et al.

(10) Patent No.: US 11,236,729 B2
(45) Date of Patent: Feb. 1, 2022

(54) SUPPORT FRAME AND METHOD FOR DETERMINING MOVEMENTS OF A WIND TURBINE BLADE DURING TRANSPORT TO AN INSTALLATION SITE

(71) Applicant: Vestas Wind Systems A/S, Aarhus N. (DK)

(72) Inventors: Michael Kastrup, Hornslet (DK); Kennet Hvid Nielsen, Randers Nv (DK); Kurt Jensen, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 108 days.

(21) Appl. No.: 16/957,782

(22) PCT Filed: Dec. 13, 2018

(86) PCT No.: PCT/DK2018/050359
§ 371 (c)(1),
(2) Date: Jun. 25, 2020

(87) PCT Pub. No.: WO2019/129329
PCT Pub. Date: Jul. 4, 2019

(65) Prior Publication Data
US 2021/0062792 A1   Mar. 4, 2021

(51) Int. Cl.
*F03D 13/40*   (2016.01)
(52) U.S. Cl.
CPC ........ *F03D 13/40* (2016.05); *F05B 2270/808* (2013.01)
(58) Field of Classification Search
CPC ............... F03D 13/40; F05B 2270/808; F05B 2270/80; F05B 2270/821; Y02E 10/72;
(Continued)

(56) References Cited

U.S. PATENT DOCUMENTS

| | | |
|---|---|---|
| 9,638,162 B1 | 5/2017 | Fletcher et al. |
| 2012/0043250 A1 | 2/2012 | Nogueira et al. |
| 2016/0053740 A1 | 2/2016 | Landrum et al. |

FOREIGN PATENT DOCUMENTS

| | | |
|---|---|---|
| DE | 102008055544 A1 | 6/2009 |
| EP | 1956234 A2 | 8/2008 |

(Continued)

OTHER PUBLICATIONS

Danish Patent and Trademark Office, Search and Examination Report in PA 2017 71031, dated May 9, 2018.

(Continued)

*Primary Examiner* — Jun S Yoo
(74) *Attorney, Agent, or Firm* — Wood Herron & Evans LLP

(57) ABSTRACT

A support frame (44) and method are described herein for support of a wind turbine blade (22) on a vehicle during transport to an installation site. A load indicator (46) is provided adjacent one or more support pads (52) when using the support frame (44), with the load indicator (46) being configured to determine and communicate an amount of movement of the wind turbine blade (22) relative to the support frame (44) during initial loading into the support frame (44) and during transport. To this end, the load indicator (46) helps assure that the wind turbine blade (22) is properly loaded into the support frame (44) in a desired transport position, while also confirming whether significant shocks or other movements have occurred during transport that could lead to a higher likelihood of internal or external damage at the blade (22).

17 Claims, 9 Drawing Sheets

(58) Field of Classification Search
CPC ...... B60P 3/40; B60P 7/12; B60P 7/13; B61D 3/16; B61D 3/166; B61D 45/003; B65D 85/68; B65G 67/12
See application file for complete search history.

(56) References Cited

FOREIGN PATENT DOCUMENTS

| | | | | |
|---|---|---|---|---|
| EP | 2075467 | A2 | 7/2009 | |
| EP | 2418376 | A1 | 2/2012 | |
| EP | 2607693 | A1 * | 6/2013 | ............. F03D 13/40 |
| EP | 2607693 | A1 | 6/2013 | |
| EP | 2708731 | A2 | 3/2014 | |
| EP | 2832675 | A1 | 2/2015 | |
| EP | 2952733 | A1 | 12/2015 | |
| GB | 2487072 | A * | 7/2012 | ............. F03D 17/00 |
| GB | 2487072 | A | 7/2012 | |

OTHER PUBLICATIONS

European Patent Office, International Search Report and Written Opinion in PCT Application No. PCT/DK2018/050359, dated Apr. 12, 2019.

* cited by examiner

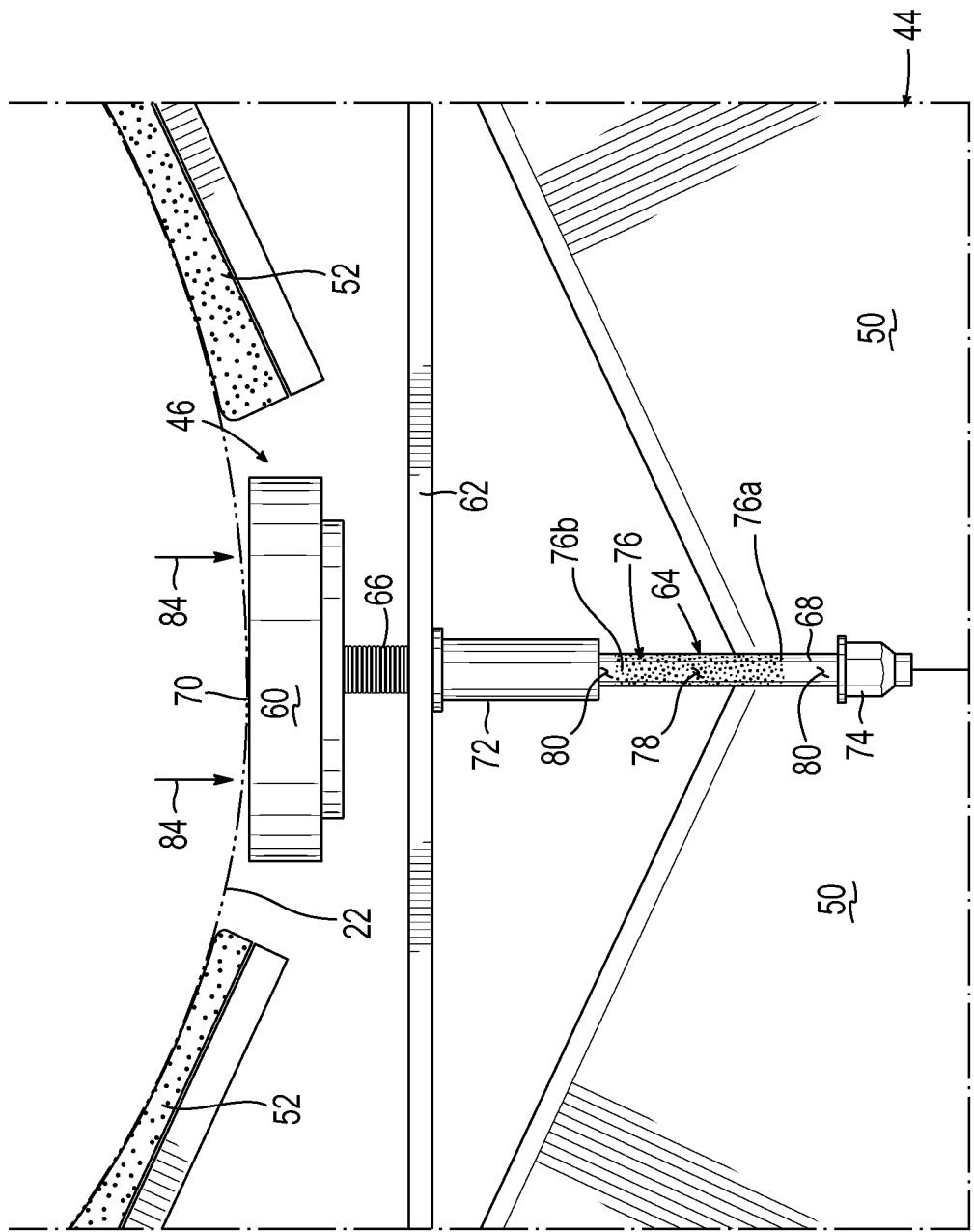

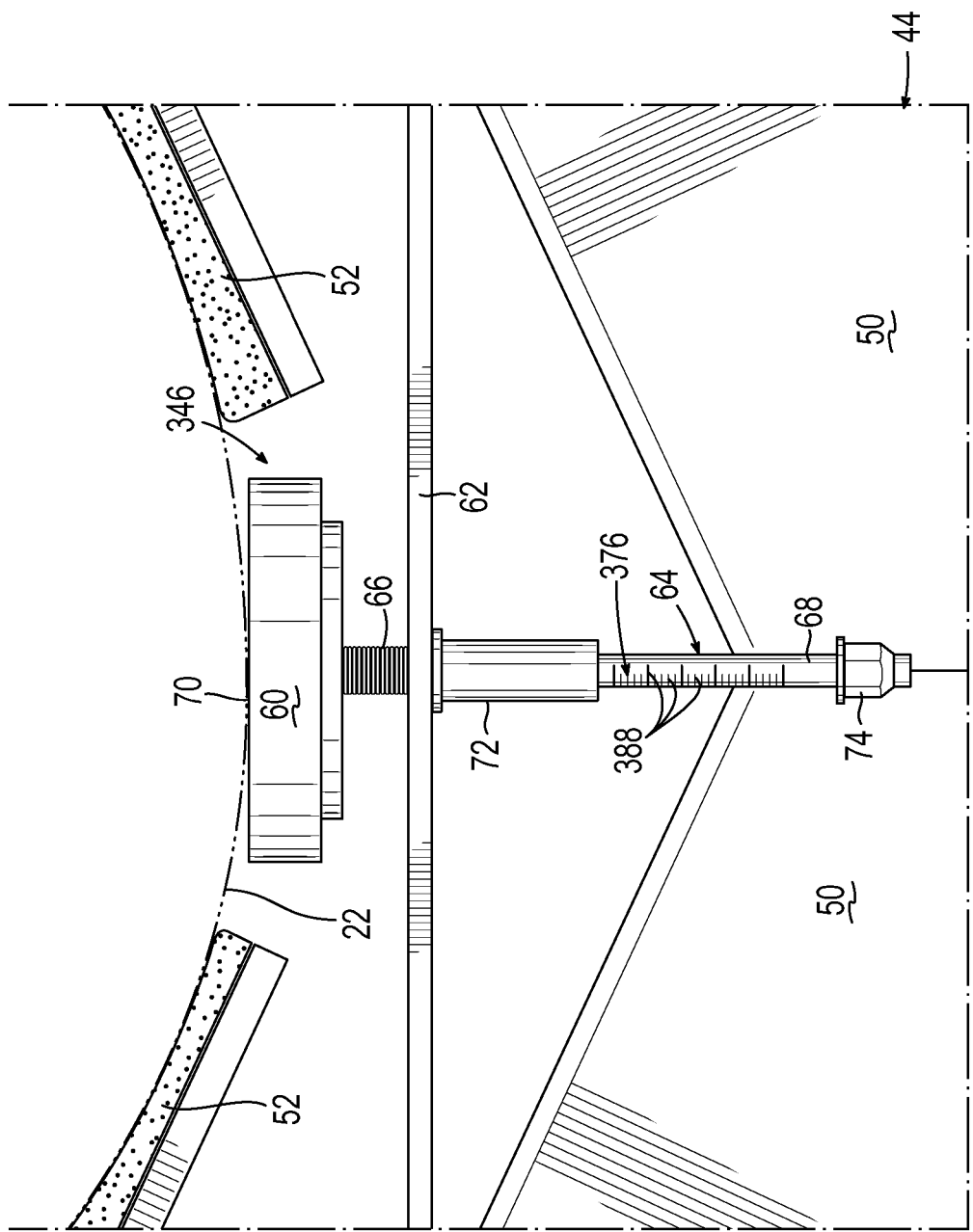

SUPPORT FRAME AND METHOD FOR DETERMINING MOVEMENTS OF A WIND TURBINE BLADE DURING TRANSPORT TO AN INSTALLATION SITE

TECHNICAL FIELD

The present invention relates generally to wind turbine blades, and more particularly, to systems and methods used when transporting wind turbine blades to a site of installation.

BACKGROUND

Wind turbines are used to produce electrical energy using the renewable resource of wind flow and without combusting a fossil fuel. Generally, a wind turbine converts kinetic energy into mechanical energy and then subsequently converts the mechanical energy into electrical energy. A horizontal-axis wind turbine includes a tower, a nacelle located at the apex of the tower, and a rotor that is supported in the nacelle. The rotor is coupled either directly or indirectly with a generator, which is housed inside the nacelle. The rotor includes a central hub and a plurality of blades mounted thereto and extending radially therefrom.

Generally, electrical energy production from a wind turbine increases with the size of the wind turbine. Therefore, modern multi-megawatt wind turbines are massive structures and the trend toward larger structures continues. These massive structures are assembled from component parts. As such, many wind turbines have their various component parts delivered in separate pieces to the site of the wind turbine installation. For example, the wind turbine tower, which may be formed by several tower sections, may be delivered to the installation site. The nacelle may be delivered to the installation site and mounted on the tower following its assembly. Lastly, the blades, themselves being quite massive in size, are often transported individually to the installation site. Each wind turbine blade is raised and secured to a rotor hub normally via a pitch bearing, whereby the load from the wind turbine blade is transferred to the rotor hub.

The massive wind turbine blades are complex structures unto themselves. They are often constructed of a shell, spar caps, and one or more shear webs. The shell is typically a layered composite and forms the exterior surface of the blade that has an aerodynamic foil shape and that encloses the shear webs and spar caps, which provide the structural aspects of the blade. The shear webs and spar caps may take the form of an internal spar that enables the shell to resist flap and edgewise loading during use of the blade. Conventional wind turbine blades are typically produced by a complex production process performed at a centralized manufacturing facility. These large turbine blades are then transported from the manufacturing facility to the installation site, which may be hundreds to thousands of kilometers away. The transport process is logistically complex, particularly where the installation site for the wind turbine is remote. Moreover, blades can be subjected to vibrations, shocks, and other damage during transport on trains, boats, vehicles, and the like, and repairing this damage from transport adds significantly to the cost of installing wind turbines. In some cases, this damage from transport is not detected or corrected until after installation at the wind turbine, which further exacerbates the potential cost of such issues by adding further complexity to the repair process and operational downtime for the wind turbine. In some cases, an entire new replacement blade must be provided, which is highly expensive and subject to the same risks of damage during transport to the wind turbine.

Several conventional systems have been developed for addressing the transportation of blades, but further improvement remains possible. In this regard, one example of a blade transport system is described in European Patent Application Publication No. 1 956 234 to General Electric Company. In that published application, a support frame is provided with a framework and a plurality of support pads that hold and cushion a wind turbine blade within the framework during transport, such as by railcar as shown in FIGS. 3 and 7. Multiple support frames (2) are located at different positions along the span length of the blade. Another example of a known blade transport system using support frames is provided in U.S. Patent Application Publication No. 2012/0043250 to Tecsis Technologia E. Sistemas Avancados, of Brazil. As shown in FIGS. 1 and 2 of this reference, one support frame is typically positioned at the root end or near the root end of the blade, while another support frame is located in a so-called mid-tip region and closer to the tip of the blade than the root end. When transporting blades in such a configuration, damage appears to occur more often at the mid-tip region rather than the root end. However, these and other conventional transport designs have failed to negate the risk of damage caused at the mid-tip region, nor have these designs provided a way to detect higher risk of damage having occurred during transport. Accordingly, further improvements in the field of blade transport remain possible.

As such, it would be desirable to limit the amount of damage in transport that occurs when moving a wind turbine blade. Moreover, it is also desirable to detect damage more reliably before the wind turbine blade is installed, to avoid wind turbine downtime and increased costs of blade repair and/or replacement.

SUMMARY

A support frame and method are described herein for support of a wind turbine blade on a vehicle during transport to an installation site. A load indicator is provided adjacent one or more support pads when using the support frame of this invention, with the load indicator being configured to determine and communicate an amount of movement of the wind turbine blade relative to the support frame during initial loading into the support frame and during transport. To this end, the load indicator helps assure that the wind turbine blade is properly loaded into the support frame in a desired position, while also confirming whether significant shocks or other movements have occurred during transport that could lead to a higher likelihood of internal or external damage at the blade. The invention therefore addresses many of the drawbacks discussed above with conventional wind turbine blade transport systems and practices.

In one embodiment, according to the invention, a support frame is provided for retaining a wind turbine blade on a vehicle during transport to an installation site. The support frame includes an outer framework and a plurality of support pads operatively connected to the outer framework and configured to engage the wind turbine blade when the blade is positioned within the outer framework. The support frame also includes a load indicator operatively connected to the outer framework and adjacent to at least one of the support pads. The load indicator includes a contact element configured to abut the blade when the blade is positioned into engagement with the plurality of support pads, a base, a support element extending from the contact element to the base, and a biasing member configured to bias the contact element away from the base. The contact element and the support element are moveable relative to the base such that the load indicator is configured to determine and communicate an amount of movement of the wind turbine blade relative to the support pads and the outer framework during loading of the blade into the outer framework and during transport. The support frame therefore confirms proper loading of the wind turbine blade for transport and whether excessive shocks, vibrations, or other movements have occurred during transport, which would be indicative of potential damage to the blade.

In one aspect, the contact element of the load indicator includes a plate-like member having a planar abutment surface that abuts the blade when the support frame is in use. The support element includes an elongate rod extending through a receptacle mounted on the base. Movement of the contact element is detected by an amount of movement of the elongate rod relative to the receptacle, which can be identified using a movement indicator as described below. Moreover, the biasing member includes a spring sandwiched between the contact element and the base.

In another aspect, the load indicator further includes a movement indicator located on the support element. A position of the movement indicator relative to the base is visible to a user, which allows the movement indicator to confirm the amount of movement of the wind turbine blade relative to the support pads and the outer framework. In some embodiments, the movement indicator includes differently-colored segments of the support element. A position of the differently-colored segments relative to the base provides information indicative of the amount of movement of the wind turbine blade relative to the support frame. The differently-colored segments may further define a first portion that is configured to indicate whether the wind turbine blade has moved to a desired transport position upon initial loading of the blade into the outer framework, and a second portion that is configured to indicate whether the wind turbine blade has moved more than a desired amount during the transport operation. In other embodiments, the movement indicator includes distance indicia provided on the support element such that a precise measurement of the amount of movement of the wind turbine blade relative to the support frame is visible to a user.

In a further aspect, the support frame includes a plurality of load indicators positioned at different portions of the outer framework. The plurality of load indicators is configured to determine and communicate an amount of movement of different portions of the wind turbine blade relative to the support pads and the outer framework. Any number of load indicators may be provided, depending on the desires of the end user transporting the blade to a site of installation. The support frame is designed for installation and use at a mid-tip region of the blade, with one of the load indicators being along the leading edge of the blade, which is the most likely area of damage during transport.

In another embodiment of the invention, a method for supporting a wind turbine blade on a vehicle during transport to an installation site is provided. The method includes inserting the wind turbine blade into a support frame, which includes an outer framework, a plurality of support pads, and a load indicator adjacent to at least one of the support pads. The wind turbine blade engages the plurality of support pads to be retained within the outer framework. The method also includes contacting the wind turbine blade with the load indicator during insertion of the wind turbine blade into the support frame. The load indicator is configured to determine and communicate whether the wind turbine blade has moved into a desired transport position within the support frame. The load indicator then measures an amount of movement of the wind turbine blade relative to the outer framework and the support pads during transport to the installation site. This measurement of movement during transport can be indicative of whether damage has occurred to the blade in the transport process.

In one aspect, the method also includes repositioning the wind turbine blade within the support frame after insertion of the blade, and when the load indicator communicates that the blade has not moved into the desired transport position. This determination of the load indicator may occur based on an amount of movement of the load indicator detected during the initial loading of the blade into the support frame. The method may also include inspecting the wind turbine blade for damage caused during the transport, when the load indicator measures that the amount of movement of the wind turbine blade relative to the outer framework and the support pads exceeds a predetermined threshold.

In another aspect of the method, the load indicator further includes a contact element configured to abut the blade, a base, a support element extending from the contact element to the base, and a biasing member configured to bias the contact element away from the base. The method then further includes communicating the amount of movement of the wind turbine blade relative to the outer framework and the support pads with a movement indicator on the support element. The movement indicator shows a distance the contact element has moved relative to the base and against bias from the biasing element. In some embodiments, the movement indicator includes differently-colored segments of the support element. The method then includes visually verifying which of the differently-colored segments is positioned adjacent the base, following blade loading into the support frame or following transport of the blade, to identify the amount of movement of the blade. In other embodiments, the movement indicator includes distance indicia provided on the support element. The method then includes visually verifying by reading the distance indicia positioned adjacent the base, following blade loading into the support frame or following transport of the blade, to provide a precise measurement of the amount of movement of the wind turbine blade.

In yet another aspect, the method includes returning the contact element of the load indicator to an original position spaced apart from the base with the biasing member, only after the wind turbine blade is transported to the installation site and removed from the support frame. The support frame may include a plurality of load indicators positioned at different portions of the outer framework. In these embodiments, the method includes contacting the wind turbine blade with the plurality of load indicators during insertion of the blade into the support frame, and measuring an amount of movement of the wind turbine blade in multiple directions relative to the outer framework and the support pads during transport to the installation site. The measurements are performed using the plurality of load indicators.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

FIG. 7C is a detail front view of the load indicator of FIG. 7B, with the load indicator further moved by the wind turbine blade during transport, and the movement indicator on the load indicator showing whether the further movements during transport are indicative of potential damage to the blade; and FIG. 8 is a detail front view, similar to FIGS. 7A through 7C, but showing an alternative embodiment of the load indicator used with the support frame, with this load indicator having a movement indicator including distance indicia.

DETAILED DESCRIPTION

With reference to FIGS. 1 through 8, exemplary embodiments of a wind turbine 10 having a plurality of blades 22, as well as a support frame and method for supporting the blades 22 on a vehicle during transport to an installation site are shown in detail, in accordance with the principles of the invention. Advantageously, the wind turbine blades 22 are transported to the site of installation of the wind turbine 10 using a support frame with at least one load indicator included on the support frame. The load indicator is configured to determine and communicate an amount of movement of the blade 22 during initial positioning into the support frame and then also during transport on the vehicle. To this end, the load indicator provides information regarding whether the wind turbine blade 22 is correctly loaded in a desirable position within the support frame, and it also provides information regarding whether shocks, vibrations, and other forces applied to the blade 22 during transport caused movements of the blade 22 within the support frame that could have resulted in damage to the blade 22. The wind turbine blade 22 can be scanned for internal or external damages when movement during transport exceeds a predetermined threshold, such that any damage can be more reliably identified and repaired or otherwise addressed before the blade 22 is installed at the wind turbine 10. As a result, the various problems with long-distance transport of finished wind turbine blades and the failure to detect and/or correct damage caused during transport are avoided when using the support frame with the load indicator(s), in accordance with the description provided herein. These and other technical effects achieved by the invention are described in further detail below.

Figure 1:
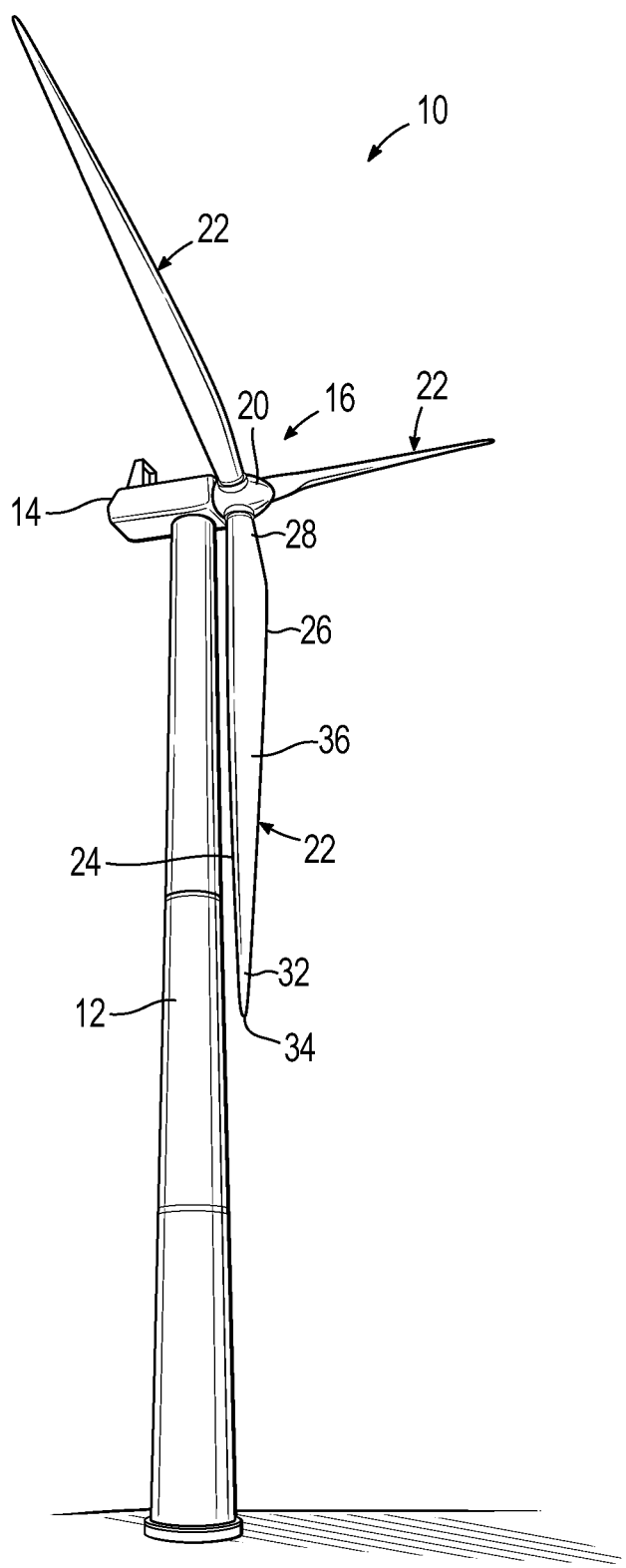
FIG. 1 is a perspective view of a wind turbine including a plurality of blades, the blades being transported to the site of installation in accordance with one embodiment of the invention.

With reference to FIG. 1, the wind turbine 10 includes a tower 12, a nacelle 14 disposed at the apex of the tower 12, and a rotor 16 operatively coupled to a generator housed inside the nacelle 14. The rotor 16 of the wind turbine 10 includes a central hub 20 and a plurality of wind turbine blades 22 that project outwardly from the central hub 20 at locations circumferentially distributed around the hub 20. As shown, the rotor 16 includes three wind turbine blades 22, but the number of blades may vary from one wind turbine to another. The wind turbine blades 22 are configured to interact with air flow to produce lift that causes the rotor 16 to spin generally within a plane defined by the wind turbine blades 22. As described in further detail below, the blades 22 are typically individually manufactured at a centralized site and then transported to the site of installation of the wind turbine 10, where the blades 22 are then lifted and installed onto the central hub 20 into the configuration shown in FIG. 1.

With continued reference to FIG. 1, in addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found. The rotor 16 of the wind turbine 10, which is represented as a horizontal-axis wind turbine, serves as the prime mover for the electromechanical system. Wind exceeding a minimum level will activate the rotor 16 via the wind acting on the blades 22, and thereby cause rotation in a substantially perpendicular direction to the wind direction. This rotation activates the generator inside the nacelle 14, which then produces electrical energy.

The wind turbine 10 may be included among a collection of similar wind turbines belonging to a wind farm or wind park (not shown) that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities.

Under normal circumstances, the electrical energy is supplied from the generator 18 to the power grid as known in the art.

Figure 2:
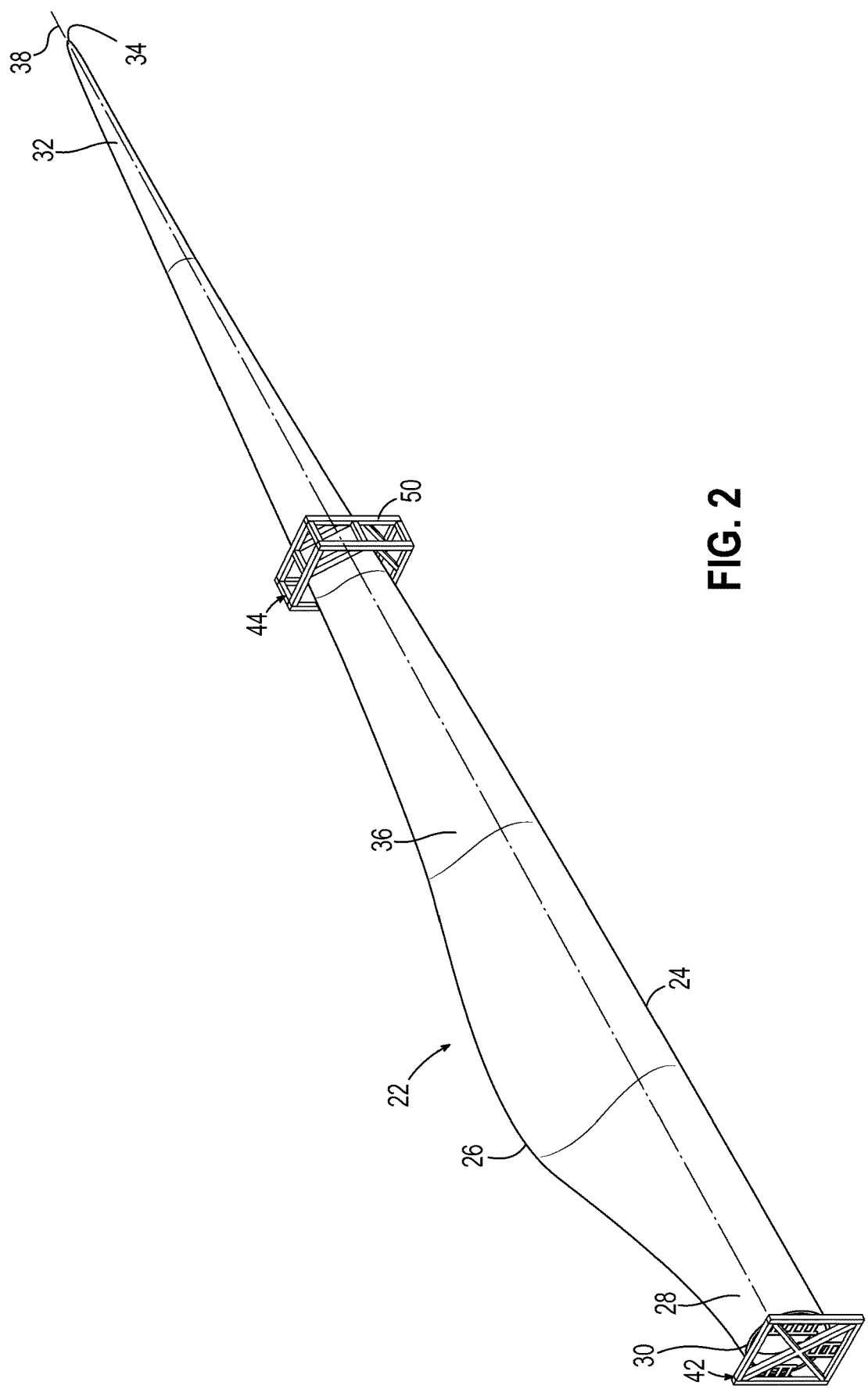
FIG. 2 is a to perspective view of one of the wind turbine blades of FIG. 1 loaded into support frames, with the support frame at the mid-tip region being in accordance with the invention.

As noted above, localized wind flow causes the blades 22 to activate rotation of the rotor 16 when in the installed configuration shown in FIG. 1. To this end, air flowing over the wind turbine blade 22 produces lift between a suction surface and a pressure surface of the wind turbine blade 22 to cause the rotor 16 to rotate. As is understood in fluid dynamics, air flowing over the wind turbine blade 22 forms a boundary layer that may separate from the outer surface of the wind turbine blade 22 between a leading edge 24 of the wind turbine blade 22 and a trailing edge 26 of the wind turbine blade 22, depending on air speed, geometry (e.g., angle of attack), or other factors. These and other features of a typical wind turbine blade 22 are shown in a transport configuration in FIG. 2. The leading edge 24 and the trailing edge 26 may extend from a root region 28 of the wind turbine blade 22 including a root end 30, at which location the wind turbine blade 22 is configured to be secured to the rotor 16, to a tip region 32 including a tip 34 of the wind turbine blade 22. A mid span region 36 extends between the root region 28 and the tip region 32. FIG. 2 also illustrates the longitudinal axis 38 of the blade 22 that extends along the span length of same.

With continued reference to FIG. 2, the wind turbine blade 22 is shown in a transport configuration with two support frames in position to support the blade 22 on a vehicle (not shown), such as a train, a ship, or a truck. More specifically, the root end 30 of the blade 22 is inserted into a first support frame 42, which may be of a conventional design like those described above in the background section, and a second support frame 44 receives the blade 22 along a so-called "mid-tip region," which is defined along the tip region 32 and the mid span region 36 of the blade 22. Although not shown in detail in FIG. 2, the second support frame 44 includes a load indicator 46 in accordance with the principles of this invention. Although damage, at least if it occurs during transport of the blade 22, is significantly more common at the mid-tip region than at the root region 28, alternative embodiments of the invention may include one or more load indicators 46 at the first support frame 42 as well, without departing from the scope of this disclosure. However, for the sake of clarity and simplicity, focus will be on the support frame 44 located at the mid-tip region in the following description of the exemplary embodiments.

More or fewer support frames 42, 44 may be provided along the longitudinal span length of the wind turbine blade 22 in other embodiments. However, a minimum of two support frames 42, 44 is generally required for all transport operations. The support frame 44 at the mid-tip region is generally located 25% to 35% of the span length away from the tip 34, e.g., closer to the tip region 32 than the root region 28. The wind turbine blade 22 may be oriented in various directions within the support frames 42, 44, depending on the vehicles being used to transport the blade 22 and the needs of the end user. In FIG. 2, the wind turbine blade 22 is oriented such that the leading edge 24 is oriented generally downwardly within the support frames 42, 44. However, alternative orientations within the support frames 42, 44 are possible in other embodiments of the invention.

Figure 3:
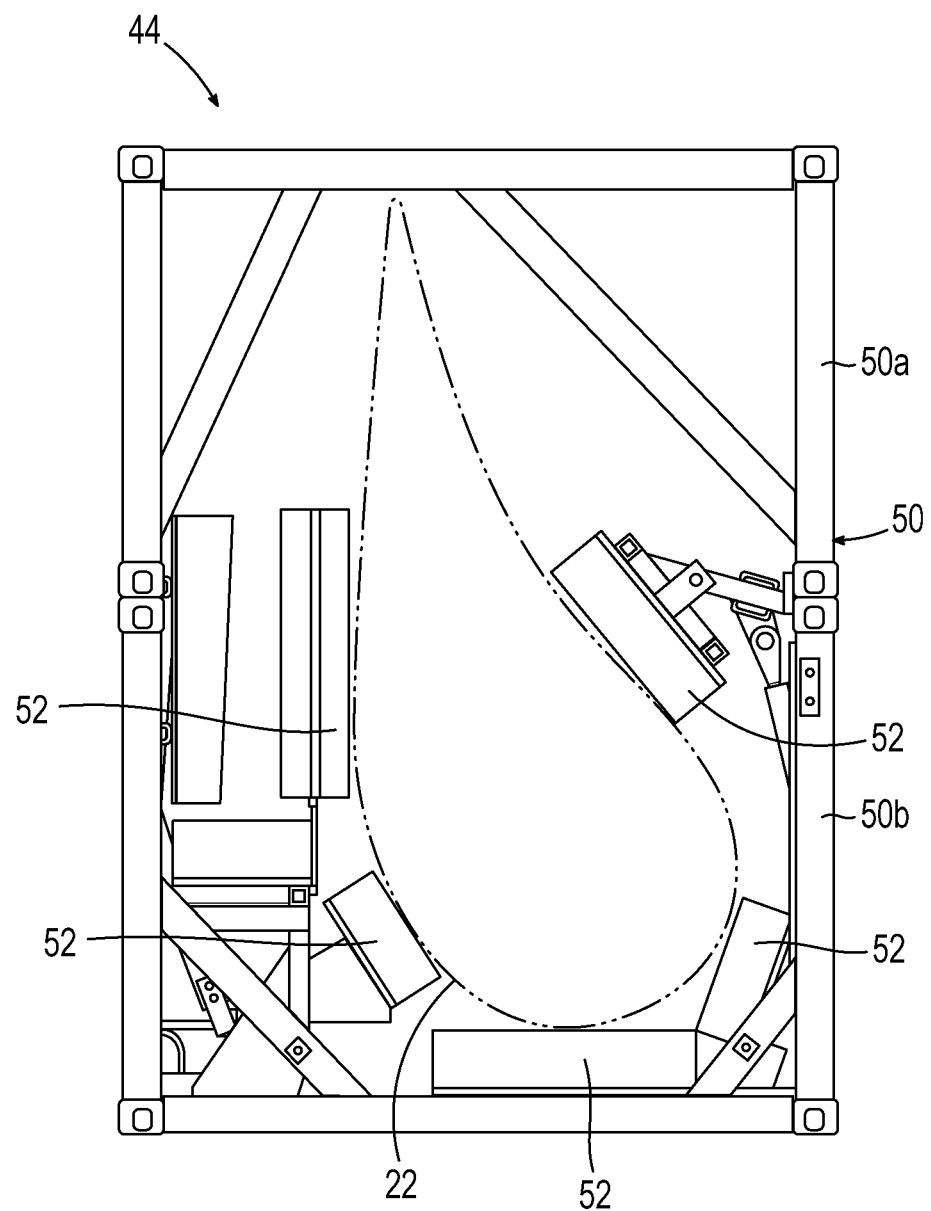
FIG. 3 is a front view of a conventional support frame that would have been used in the transport configuration of FIG. 2, which includes a plurality of support pads and which may be modified to be in accordance with the principles of the invention.

The support frame 44 typically includes an outer framework 50 and a plurality of support pads 52 for engaging and supporting the wind turbine blade 22, and one example of such an arrangement in the support frame 44 is shown in FIG. 3. The specific arrangement of the support frame 44 in FIG. 3 is like one arrangement shown and described in EP 1 956 234, discussed above in the background section, but it will be appreciated that the support frame 44 also includes a load indicator 46 added in one or more locations as described further in the following Figures. It will also be understood that the specific shape and layout of the support pads 52 within the outer framework 50 can be modified in other embodiments, such as when the shape of the wind turbine blade 22 to be transported varies in alternative wind turbine designs. For example, the support pads 52 can be adjusted to a different configuration to be in position for supporting and transporting a blade 22 with a different shape and profile, which may be necessary when the support frame 44 is to be re-used for a plurality of transport operations.

With continued reference to FIG. 3, one typical arrangement of the support pads 52 within the outer framework 50 is shown when the wind turbine blade 22 is to be transported with the leading edge 24 facing generally downwardly (and towards a lower corner defined by the outer framework 50 in this example). The outer framework 50 is typically formed from rigid, structural materials such as steel, and this outer framework 50 is shown provided in an upper portion 50a and a lower portion 50b. The support pads 52 may be provided on one or both of the upper and lower portions 50a, 50b. The upper and lower portions 50a, 50b are brought together into engagement to enclose the blade 22 (shown in phantom) once the blade 22 is inserted into engagement with the support pads 52 on the lower portion 50b. It will be understood that the outer framework 50 may be defined by a different number of portions and assembled into the final transport configuration shown in FIG. 3 in different manners in other embodiments consistent with the invention.

The support pads 52 each include any suitable material that provides support to the outer surface of the wind turbine blade 22 as well as dampening of shocks and vibrational forces that may be applied to the outer framework 50 during normal transport functions on vehicles. In one example, the support pads 52 include materials such as compressed natural fibers with latex, or a memory foam that returns to an original shape after compression caused by supporting the wind turbine blade 22. The support pads 52 also typically include a protective cover or outer sheet formed from a material such as polyurethane or EPDM rubber. Other known materials may be used for the support pads 52 depending on the preferences of the end user, so long as the functionality of support and reducing shocks/vibrations continues to be provided at the support frame 44. As noted above, the support pads 52 engage the wind turbine blade 22 and generally conform to the shape of the blade 22 to maintain the blade 22 in position during transport on the vehicle(s) to the final installation site of the wind turbine 10. Therefore, the materials chosen and the size and positioning of the support pads 52 are tailored to spread the weight load of the wind turbine blade 22 across relatively large support surfaces to thereby reduce the risk of high localized pressures or forces being applied that could lead to damage to the blade 22.

Advantageously, the support frame 44 includes one or more load indicators 46 to measure movement of the wind turbine blade 22 within the support frame 44 during initial loading and during transport operations. Several embodiments of the support frame 44 are shown schematically in FIGS. 4 through 6 to help illustrate this feature of the present invention.

Figure 4:
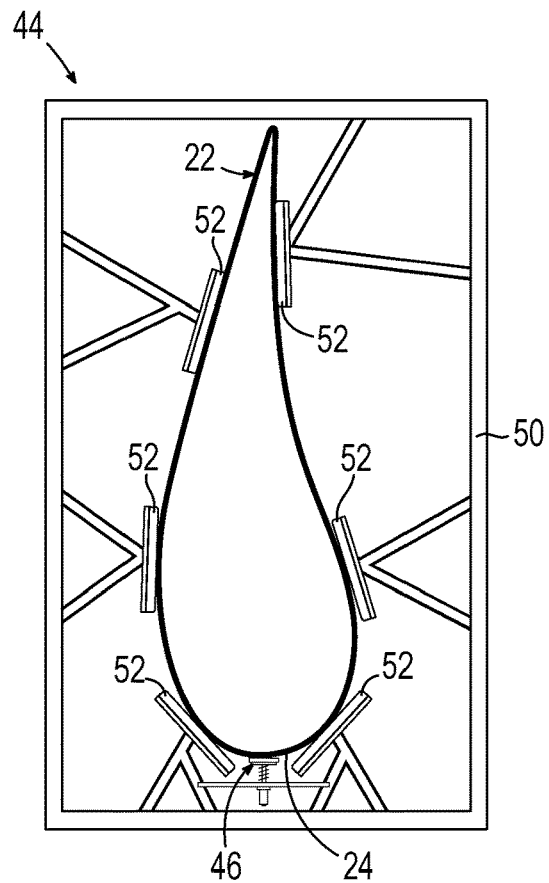
FIG. 4 is a schematic front view of one embodiment of a support frame in accordance with the invention, the support frame including a load indicator at the leading end of the blade.

As with the example shown in FIG. 3, the support frame 44 of FIG. 4 is configured to transport the wind turbine blade 22 in an orientation with the leading edge 24 pointed downwardly towards a bottom of the outer framework 50. A plurality of support pads 52 are operatively connected to the outer framework 50 and extend into engagement with different areas along the outer surface of the blade 22. The load indicator 46 of this embodiment of FIG. 4 is also operatively connected to the outer framework 50 adjacent the support pads 52 that engage the blade 22 at or near the leading edge 24. More specifically, the load indicator 46 is positioned to engage the blade 22 at the leading edge 24 in this arrangement. Particularly when transporting the wind turbine blade 22 in this orientation, any load or force concentrations that occur, despite the design of the support pads 52 to minimize such concentrations, are more typical along the leading edge 24 than at other portions of the blade 22. Accordingly, by positioning the load indicator 46 at the leading edge 24, any significant unexpected movements of the blade 22 within the support frame 44 can be detected and communicated at the position of most likely load concentrations and potential damage. It will be understood that the load indicator 46 may be connected directly to the adjacent support pads 52 or directly to the outer framework 50 in different embodiments of this invention, as the load indicator 46 must simply be supported in such a manner that movements of the blade 22 can be detected relative to the generally stationary support provided. The specific elements of the load indicator 46 and the operation thereof to detect such movements are described in further detail below with reference to FIGS. 7A through 7C.

Figure 5:
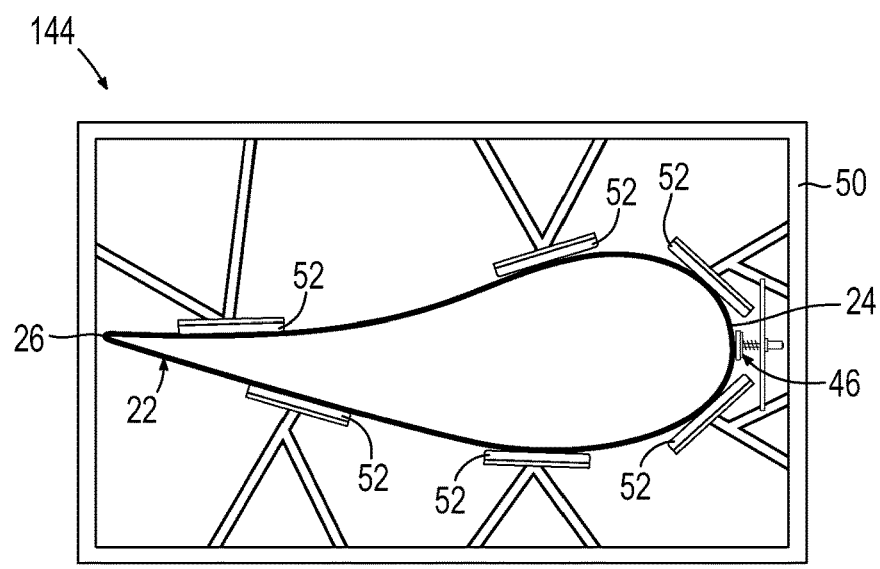
FIG. 5 is a schematic front view of another embodiment of a support frame in accordance with the invention, the support frame being configured to orient the wind turbine blade at a different angle than the one shown in FIG. 4, but this support frame embodiment continuing to include the load indicator.
Figure 6:
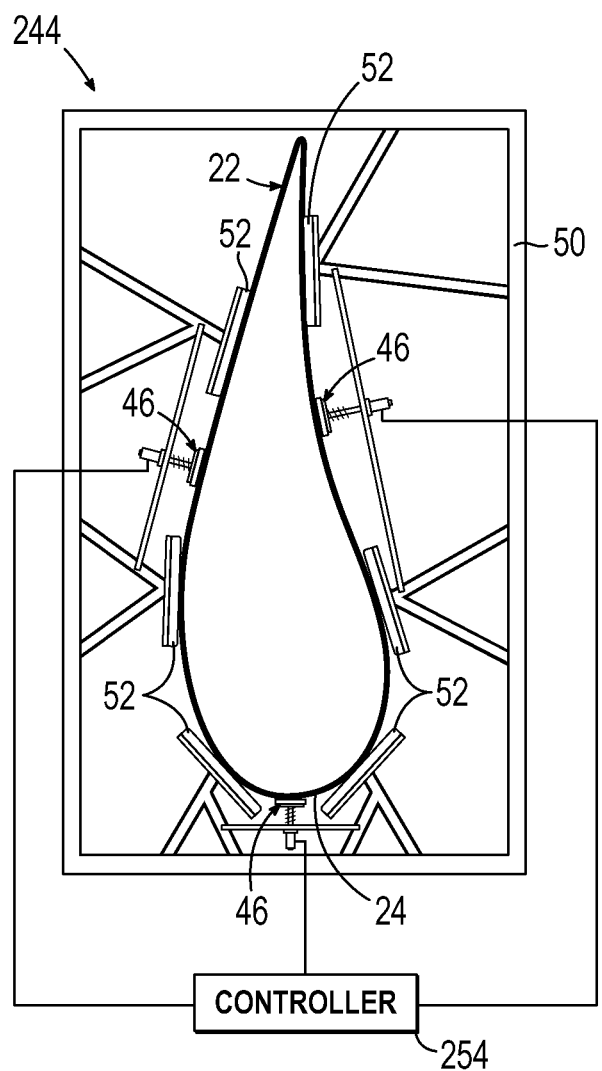
FIG. 6 is a schematic front view of a further embodiment of a support frame in accordance with the invention, with this support frame including a plurality of load indicators located at different portions of the blade.

Before describing those specifics, two alternative arrangements of the support frame and load indicator(s) are shown in FIGS. 5 and 6. In FIG. 5, the support frame 144 is generally the same as the one shown in FIG. 4, but the outer framework 50 and the support pads 52 are positioned such that the blade 22 is supported in an orientation more horizontal than vertical. In this regard, the leading edge 24 and the trailing edge 26 both face laterally to the side in this embodiment of the support frame 144. However, the load indicator 46 is once again positioned adjacent the support pads 52 at the leading edge 24 of the blade 22, to thereby detect and communicate movements of the blade 22 at the leading edge 24.

In FIG. 6, the support frame 244 again includes an outer framework 50 and support pads 52 in generally the same configuration as in FIG. 4, including with the generally vertical orientation of the blade 22. However, the support frame 244 of FIG. 6 includes a plurality of load indicators 46 positioned adjacent the support pads 52 at different portions of the outer framework 50 and different portions of the outer surface of the wind turbine blade 22. For example, three total load indicators 46 are shown in the schematic view of FIG. 6 for this embodiment, each of which is directly mounted between two support pads 52. It will be understood that more or fewer load indicators 46 may be provided, including at different locations, such as along the trailing edge 26, in other embodiments consistent with the scope of this disclosure. Regardless of whether multiple load indicators 46 are provided or one at the most likely zone of load concentrations and damage, the support frames 44, 144, 244 used in accordance with the principles of this invention help provide information regarding movements of the blade 22 during initial loading into the frame and during transport. This information helps reduce the likelihood of damage caused during improper loading before transport and identifies when damage may have occurred with higher reliability, to thereby overcome several deficiencies with conventional designs as described herein.

The load indicators 46 included with the support frame 244 in the embodiment of FIG. 6 are also operatively connected to a controller 254. As described in further detail below, the load indicator 46 of the embodiments shown in the Figures is designed as an analog device that can be read by a user to provide the information regarding positioning and movement of the wind turbine blade 22, and such a device adds minimal cost to the overall cost of the support frame 44, 144, 244. However, in further embodiments of the invention, the load indicator 46 (whether one or a plurality thereof) may also include some type of digital load sensor or other digital measurement component that can communicate this information to the controller 254 as shown schematically in FIG. 6. Any type of known digital sensor or the like can be used in such embodiments. For example, the readings of the load indicator 46 could be collected and communicated in real time to a transport logistics center or to the cabin of the vehicle performing the transport operation, so as to provide feedback regarding movements occurring at the blade 22 during specific parts of the transport to the final installation site. Such embodiments may provide enhanced communication and benefits, including but not limited to, potential identification of the precise area of the transport operation where significant vibrations or shocks occur, so that future transport operations can avoid or correct for these issues. Such embodiments continue to provide the advantages of detecting and communicating movements of the wind turbine blade 22 within the support frame 244 to identify when a risk of damage has occurred in transport.

Figure 7A:
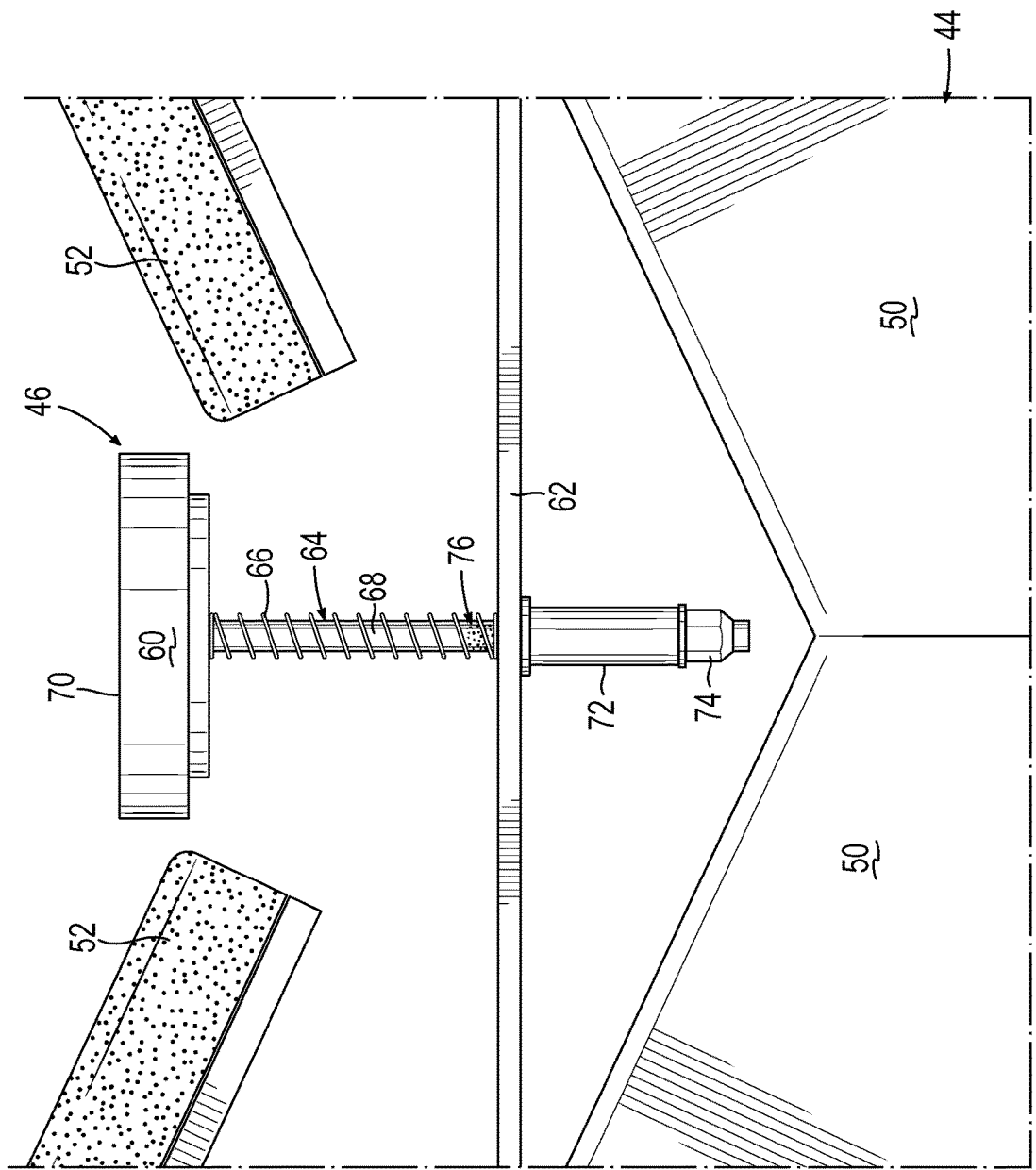
FIG. 7A is a detail front view of the load indicator used with the support frame according to one embodiment of the invention, the load indicator shown in an initial position before loading of the wind turbine blade into the support frame.
Figure 7B:
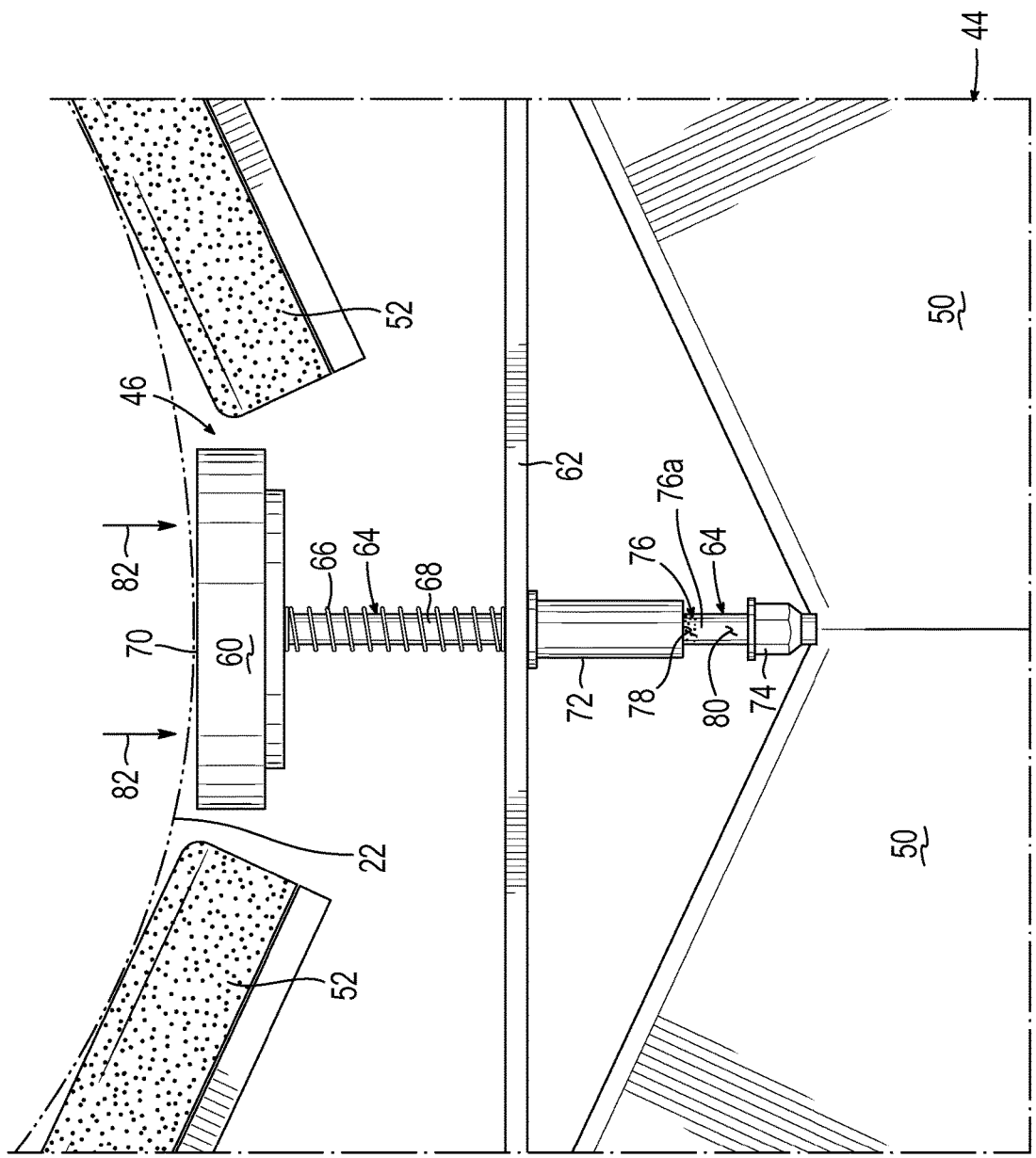
FIG. 7B is a detail front view of the load indicator of FIG. 7A, with the load indicator moved by the wind turbine blade to another position following initial loading into the support frame, and a movement indicator in the form of differently-colored segments on the load indicator showing whether the wind turbine blade is properly positioned.

Now turning with reference to FIGS. 7A through 7C, an exemplary embodiment of the load indicator 46 of the support frame 44 is shown in further detail during operation. Additional elements and functionality details are shown with the load indicator 46 moving between several positions in these drawing views. In this regard, the load indicator 46 includes a contact element 60 at an uppermost end thereof, the contact element 60 being configured to abut the wind turbine blade 22 when the blade 22 is loaded into the support frame 44. The load indicator 46 also includes a base 62 that is connected to either the support pads 52 or the outer framework 50, and a support element 64 extending from the contact element 60 to the base 62. The contact element 60 and the support element 64 are moveable relative to the base 62 such that movements of the wind turbine blade 22 (in abutment with the contact element 60) relative to the support frame 44 can be measured and communicated. To this end, the amount of movement of the contact element 60 and the support element 64 relative to the base 62 is analogous to the amount of movement of the blade 22 relative to the outer framework 50 and/or support pads 52. The load indicator 46 further includes a biasing member 66 that biases the contact element 60 upwardly away from the base 62 and towards the initial position shown in FIG. 7A.

With continued reference to FIG. 7A, the contact element 60 of the load indicator 46 in this embodiment is formed as a plate-like member, while the support element 64 includes an elongate rod 68 extending from the contact element 60 in a downward direction in the view shown in this Figure. The contact element 60 defines a planar abutment surface 70 that is configured to abut the leading edge 24 or some other external surface on the blade 22. By forming the contact element 60 with an enlarged abutment surface 70, the engagement between the blade 22 and the load indicator 46 can be more reliably assured when loading the blade 22 into the support frame 44. Moreover, the plate-like member of the contact element 60 spreads loads out to avoid any potential damage to the blade 22 at the area where the load indicator 46 abuts the blade 22. The contact element 60 and the elongate rod 68 both have a circular cross-section in this embodiment, but it will be understood that other shapes of these elements may also be provided. The contact element 60 is configured to move freely between the adjacent support pads 52 such that movements of the blade 22 are properly detected and communicated.

The base 62 of the load indicator 46 is provided as an elongated member or plate that is connected to the outer framework 50 and/or the support pads 52, and a receptacle 72 is mounted on the base 62 in this embodiment. The receptacle 72 extends downwardly from the base 62 and encloses a portion of the elongate rod 68 defining a portion of the support element 64. The receptacle 72 is sized to match the shape and size of the elongate rod 68, such as both elements being generally cylindrical in the embodiment shown in FIG. 7A. The particular shape and frictional fit defined between these elements can be modified in other embodiments to meet the needs of the end user. The support element 64 further includes an end piece 74 that is connected by threaded engagement or the like to the elongate rod 68 at an opposite end from the contact element 60. The end piece 74 is larger in size than the elongate rod 68 so as to provide an abutment or stop against the receptacle 72 to hold the contact element 60 and the support element 64 from movements beyond the initial position shown in FIG. 7A (e.g., as could be otherwise caused by the bias applied by the biasing member 66). It will be appreciated that the receptacle 72 can be repositioned or omitted in some embodiments of the load indicator 46, so long as there remains a limit to hold the support element 64 from disengagement with the base 62 and so long as the movement of the support element 64 relative to the base 62 can still be detected and communicated. Furthermore, as noted above, a digital sensor or measurement device can be included at these areas of the load indicator 46 in alternative embodiments using communication of movement information to a controller 254, but these elements are not shown in this exemplary embodiment.

The biasing member 66 of this embodiment of the load indicator 46 is defined by a spring 66, which is sandwiched between the bottom side of the contact element 60 and a top side of the base 62. The spring 66 may be a standard compression spring designed to provide sufficient bias to move the contact element 60 to the initial position shown in FIG. 7A in the absence of any opposing force applied by a wind turbine blade 22. However, the bias force provided by the spring 66 is not sufficient to resist movements of the blade 22 when the blade 22 is initially loaded into the support frame 44 and when further movements occur during a transport operation. To this end, the biasing member 66 is configured to properly position the load indicator 46 between uses, but has no significant effect on movements of the contact element 60 and the support element 64 during use, which results in the movements of the wind turbine blade 22 being accurately determined by corresponding movements of the contact element 60 and the support element 64 relative to the base 62. It will be appreciated that other types of biasing members 66 may be used in other embodiments of the invention without departing from the scope thereof.

The load indicator 46 further includes a movement indicator 76 located on the support element 64. In the example shown in FIGS. 7A through 7C, the movement indicator 76 is defined by differently-colored segments 78, 80 provided on the elongate rod 68. Movements of the support element 64, and therefore also of the contact element 60 and blade 22, can be visually detected by reviewing the position of the differently-colored segments 78, 80 relative to the base 62 and the receptacle 72. As a result, the movement indicator 76 helps confirm and communicate the amount of movement of the wind turbine blade 22 relative to the support frame 44. The differently-colored segments 78, 80 in this embodiment can be provided by a paint or coating of highly-contrasting colors, so as to make the position of the movement indicator 76 and of the support element 64 clearly visible to a user observing the load indicator 46 before and after transport of the wind turbine blade 22. In one example, the colored segment 78 is green in color, while the colored segments 80 are red in color, but other color choices or differentiating factors may also be used. The differently-colored segments 78, 80 are most clearly visible in FIG. 7C, for this embodiment of the load indicator 46.

The operation and use of the load indicator 46 as shown in FIGS. 7A through 7C will now be described in further detail. The initial position of the load indicator 46 is shown in FIG. 7A, and this initial position is defined before the wind turbine blade 22 is loaded into the support frame 44. The contact element 60 is generally positioned above the adjacent support pads 52 in this initial position, as a result of the bias from the biasing member 66. The blade 22 is then loaded into the support frame 44 so as to be in contact with the support pads 52. During this loading, the contact element 60 comes into abutment with the leading edge 24 or some other surface of the blade 22 that faces the load indicator 46. To this end, the blade 22 forces the contact element 60 and the support element 64 downwardly in the direction of arrows 82 against the bias from the biasing member 66 to the intermediate position shown in FIG. 7B. The amount of movement of the contact element 60 can be visualized based on the position of the movement indicator 76 relative to the base 62.

For example, the intermediate position shown in FIG. 7B has a portion of the green colored segment 78 pushed through the bottom end of the receptacle 72 so as to be visible below the receptacle 72. This visibility of the green colored segment 78 indicates a proper initial positioning of the blade 22 within the support frame 44. If the green colored segment 78 were not pushed downwardly a sufficient amount to be visible below the receptacle 72, e.g., only the red colored segment 80 were visible below the receptacle 72, then the user would know that the blade 22 is not properly loaded in a desired transport position within the support frame 44. Accordingly, a first portion 76a of the movement indicator 76 is the lower transition between the differently-colored segments 78, 80, and the specific position of this first portion 76a provides the indication of whether the wind turbine blade 22 has been properly loaded into the support frame 44 for transport operations. If the load indicator 46 detects and communicates that the wind turbine blade 22 is not properly loaded into a desired transport position, the user can reposition the wind turbine blade 22 within the support frame 44 before the transport begins so as to start with the blade 22 in a desired transport position. The load indicator 46 therefore advantageously assures that the blade 22 is correctly loaded into the support frame 44.

During transport, the wind turbine blade 22 will likely move further downwardly relative to the support pads 52 and the outer framework 50. These further movements will continue to move the contact element 60 and the support element 64 of the load indicator 46 downwardly. To this end, the blade 22 forces the contact element 60 and the support element 64 downwardly in the direction of arrows 84 against the bias from the biasing member 66 to another position shown in FIG. 7C. The differently-colored segments 78, 80 of the movement indicator 76 in this embodiment further define a second portion 76b located at the upper transition between the differently-colored segments 78, 80. The position of this second portion 76b relative to the receptacle 72 determines and communicates whether the amount of movement of the wind turbine blade 22 during transport exceeds a predetermined threshold that would indicate a higher risk that damage has occurred during transport to the blade 22. In this regard, as shown in the position of FIG. 7C, the red colored segment 80 at the top of the movement indicator 76 has once again become visible below the receptacle 72 when the contact element 60 and support element 64 are subjected to significant additional movement during transport of the wind turbine blade 22. The user can identify this red colored segment 80 of the second portion 76b of the movement indicator 76 is positioned below the receptacle 72 to know that excessive shocks or vibrations have forced an undesirable amount of movement of the blade 22 within the support frame 44. A full inspection for damage to the wind turbine blade 22 should then be performed before installing the blade 22 at the wind turbine 10.

If, on the contrary, the green colored segment 78 were still the only thing visible below the receptacle 72, then the further movements of the blade 22 caused during transport were not exceeding a predetermined threshold and damage to the blade 22 is unlikely. Consequently, the second portion 76b of the movement indicator 76 is configured to detect and communicate whether the wind turbine blade 22 has moved during transport to an extent that would be indicative of potential damage to the blade 22, either internally or externally. Such potential damage can be manually detected with known scanning equipment, and then repaired or otherwise addressed in a cost-effective manner before installation of the blade 22 at the wind turbine 10.

Thus, the load indicator 46 of the embodiment shown in FIGS. 7A through 7C provides multiple functionalities that improve the process for transporting wind turbine blades 22 using support frames 44. The load indicator 46 contacts the blade 22 and remains in contact with the blade 22 during initial loading of the blade 22 into the support frame 44 as well as during transport to the final installation site. The load indicator 46 therefore moves at the contact element 60 and the support element 64 with the blade 22, and this arrangement allows for detection of the amount of movement of the blade 22 relative to the support pads 52 and the outer framework 50 by indicating (with movement indicator 76) the amount of movement of the contact element 60 and the support element 64 relative to the base 62. The load indicator 46 communicates whether the blade 22 is moved into a desired transport position within the support frame 44 following the initial loading of the blade 22, and this can be easily visually identified by a user such as by providing the first portion 76a of the movement indicator 76 in a transition between differently-colored segments 78, 80 and how those are positioned relative to the base 62. Moreover, the load indicator 46 communicates whether the blade 22 then subsequently moves more than a predetermined threshold (indicative of potential damage done by vibrations, shocks, or the like) during transport, and this can be easily visually identified by a user such as by providing the second portion 76b of the movement indicator 76 in a transition between differently-colored segments 78, 80 and how those are positioned relative to the base 62. Both these functions help avoid problems with damages that may be caused by improper loading in the support frame 44 and by the transport process, and the use of the load indicator 46 in the support frame(s) 44 therefore improves and makes more reliable the process of transporting and installing wind turbine blades 22 in an undamaged state at the wind turbine 10.

It will be understood that the particular positioning of the movement indicator 76 on the support element 64 may be modified to match the needs of the transport user. For example, if the threshold of movements that are acceptable during transport is reduced, the size of the differently-colored segments 78, 80 can be adjusted to reflect these differences in amount of movement allowable. Likewise, while the load indicator 46 positioned at the bottom of the wind turbine blade 22 (e.g., at the leading edge 24 in the configuration of FIGS. 4 and 6) remains deflected by the blade 22 during transport, the bias provided by the spring 66 and the frictional engagement of the receptacle 72 and the elongate rod 68 can be reconfigured to hold the load indicator 46 by friction in a position of maximum deflection or movement caused by the blade 22 at that load indicator 46. To this end, for other portions of the blade 22 that may move towards the load indicator 46 and then back away from the load indicator 46, such a modified embodiment of the load indicator 46 would still provide reliable and accurate information on a maximum amount of movement the blade 22 experienced relative to the corresponding support pads 52 and the outer framework 50 adjacent this load indicator 46. Other variations are possible in further embodiments, so long as the load indicator 46 continues to provide the detection and communication of blade movements as set forth in detail herein.

One specific alternative embodiment of the load indicator 346 is shown in FIG. 8. The load indicator 346 is shown in a similar position after further movements of the blade 22 during transport, so as to show in further detail a modified movement indicator 376 in this embodiment. In all other respects, the load indicator 346 is identical to the load indicator 46 shown in FIGS. 7A through 7C and described above, such as by including the elements of the contact element 60, the base 62, the support element 64, and the biasing member 66. The movement indicator 376 of this embodiment includes distance indicia 388 in the form of graduated markings printed on the support element 64 in a similar fashion as the markings on a measurement device such as a ruler. The distance indicia 388 can be read based on the positioning relative to the base 62 or the receptacle 72 to identify a precise amount of movement of the wind turbine blade 22 relative to the support frame 44. This precise measurement of the amount of movement can then be compared to threshold values to determine whether the blade 22 is properly initially loaded into the support frame 44, and/or to determine whether the blade 22 moved beyond a predetermined threshold indicative of potential damage done during transport of the blade 22. It will be understood that still further types of movement indicators 76, 376 (analog or digital) may be provided in other embodiments consistent with the scope of the invention.

The use of support frames 44 with the load indicator 46 according to the embodiments of this invention allows for more reliable transport of blades 22 to an installation site. To this end, the load indicator 46 measures and communicates the amount of movement of the blade 22 relative to the support frame 44, and this allows for confirmation of initial loading position as well as whether excessive shocks and movement occurred during transport. The use of the support frames 44 and methods described herein reduces the overall cost of wind turbine installations by reducing damage done to the blade 22 during transport and by reliable detection of potential damage to allow for repair before installation. The invention therefore improves the field of wind turbine blade transportation and wind turbine installation.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination, including with any type of single rotor or multi rotor wind turbine. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A support frame for retaining a wind turbine blade on a vehicle during transport to an installation site, the support frame comprising:
    an outer framework;
    a plurality of support pads operatively connected to the outer framework and configured to engage the wind turbine blade when the blade is positioned within the outer framework; and
    a load indicator operatively connected to the outer framework and adjacent to at least one of the support pads, the load indicator including a contact element configured to abut the blade when the blade is positioned into engagement with the plurality of support pads, a base, a support element extending from the contact element to the base, and a biasing member configured to bias the contact element away from the base,
    wherein the contact element and the support element are moveable relative to the base such that the load indicator is configured to determine and communicate an amount of movement of the wind turbine blade relative to the support pads and the outer framework during loading of the blade into the outer framework and during transport.

2. The support frame of claim 1, wherein the contact element of the load indicator includes a plate-like member having a planar abutment surface configured to abut the blade.

3. The support frame of claim 1, wherein the support element of the load indicator includes an elongate rod extending through a receptacle mounted on the base, and wherein movement of the contact element is detected by an amount of movement of the elongate rod relative to the receptacle.

4. The support frame of claim 1, wherein the biasing member of the load indicator includes a spring sandwiched between the contact element and the base.

5. The support frame of claim 1, wherein the load indicator further comprises:
    a movement indicator located on the support element, wherein a position of the movement indicator relative to the base is visible such that the movement indicator confirms the amount of movement of the wind turbine blade relative to the support pads and the outer framework.

6. The support frame of claim 5, wherein the movement indicator includes differently-colored segments of the support element, and a position of the differently-colored segments relative to the base provides information indicative of the amount of movement of the wind turbine blade relative to the support pads and the outer framework.

7. The support frame of claim 6, wherein the differently-colored segments of the support element include a first portion that is configured to indicate whether the wind turbine blade has moved into a desired transport position upon initial loading of the wind turbine blade into the outer framework, and a second portion that is configured to indicate whether the wind turbine blade has moved more than a desired amount during transport.

8. The support frame of claim 5, wherein the movement indicator includes distance indicia provided on the support element such that a precise measurement of the amount of movement of the wind turbine blade relative to the support pads and the outer framework is visible.

9. The support frame of claim 1, wherein the support frame comprises a plurality of load indicators positioned at different portions of the outer framework and configured to determine and communicate an amount of movement of different portions of the wind turbine blade relative to the support pads and the outer framework.

10. A method for supporting a wind turbine blade on a vehicle during transport to an installation site, the method comprising:
    inserting the wind turbine blade into a support frame including an outer framework, a plurality of support pads, and a load indicator adjacent to at least one of the support pads, such that the wind turbine blade engages the plurality of support pads to be retained within the outer framework;
    contacting the wind turbine blade with the load indicator during insertion of the wind turbine blade into the support frame, the load indicator configured to determine and communicate whether the wind turbine blade has moved into a desired transport position within the support frame; and
    measuring, using the load indicator, an amount of movement of the wind turbine blade relative to the outer framework and the support pads during transport to the installation site.

11. The method of claim 10, further comprising:
    repositioning the wind turbine blade within the support frame after insertion of the wind turbine blade into the support frame, when the load indicator communicates that the wind turbine blade has not moved into the desired transport position.

12. The method of claim 10, further comprising:
    inspecting the wind turbine blade for damage caused during transport, when the load indicator measures that the amount of movement of the wind turbine blade relative to the outer framework and the support pads exceeds a predetermined threshold.

13. The method of claim 10, wherein the load indicator further includes a contact element configured to contact the blade, a base, a support element extending from the contact element to the base, and a biasing member configured to bias the contact element away from the base, the method further comprising:
    communicating the amount of movement of the wind turbine blade relative to the outer framework and the support pads with a movement indicator on the support element showing a distance the contact element has moved relative to the base against bias from the biasing member.

14. The method of claim 13, wherein the movement indicator includes differently-colored segments of the support element, and communicating the amount of movement of the wind turbine blade further comprises:

visually verifying which of the differently-colored segments is positioned adjacent the base, following blade loading into the support frame or following transport of the blade, to identify the amount of movement of the wind turbine blade.

15. The method of claim 13, wherein the movement indicator includes distance indicia provided on the support element, and communicating the amount of movement of the wind turbine blade further comprises:

visually verifying by reading the distance indicia positioned adjacent the base, following blade loading into the support frame or following transport of the blade, to provide a precise measurement of the amount of movement of the wind turbine blade.

16. The method of claim 13, further comprising:
returning the contact element to an original position spaced apart from the base with the biasing member, only after the wind turbine blade is transported to the installation site and removed from the support frame.

17. The method of claim 10, wherein the support frame includes a plurality of load indicators positioned at different portions of the outer framework, and the method further comprises:

contacting the wind turbine blade with the plurality of load indicators during insertion of the wind turbine blade into the support frame; and measuring, using the plurality of load indicators, an amount of movement of the wind turbine blade in multiple directions relative to the outer framework and the support pads during transport to the installation site.

* * * * *

UNITED STATES PATENT AND TRADEMARK OFFICE
CERTIFICATE OF CORRECTION

PATENT NO. : 11,236,729 B2
APPLICATION NO. : 16/957782
DATED : February 1, 2022
INVENTOR(S) : Michael Kastrup et al.

Page 1 of 1

It is certified that error appears in the above-identified patent and that said Letters Patent is hereby corrected as shown below:

On the Title Page

After (62), insert:
--(30) Foreign Application Priority Data
Dec. 28, 2017 (DK).......................2017 71031--

Signed and Sealed this
Nineteenth Day of April, 2022

Katherine Kelly Vidal
*Director of the United States Patent and Trademark Office*